US007912861B2

(12) United States Patent
Weinberg et al.

(10) Patent No.: US 7,912,861 B2
(45) Date of Patent: Mar. 22, 2011

(54) METHOD FOR TESTING LAYERED DATA FOR THE EXISTENCE OF AT LEAST ONE VALUE

(75) Inventors: Paul N. Weinberg, Los Angeles, CA (US); Dave L. Sullivan, Canoga Park, CA (US); David E. Brookler, Century City, CA (US); Richard T. Endo, Los Angeles, CA (US); Nathan F. Yospe, Glendale, CA (US)

(73) Assignee: SAP AG, Walldorf (DE)

( * ) Notice: Subject to any disclaimer, the term of this patent is extended or adjusted under 35 U.S.C. 154(b) by 965 days.

(21) Appl. No.: 11/142,005

(22) Filed: May 31, 2005

(65) Prior Publication Data
US 2006/0268107 A1 Nov. 30, 2006

(51) Int. Cl.
G06F 17/30 (2006.01)
(52) U.S. Cl. ......... 707/791; 707/736; 715/200; 715/255
(58) Field of Classification Search .................. 707/736, 707/791; 715/200, 255
See application file for complete search history.

(56) References Cited

U.S. PATENT DOCUMENTS

| | | | | |
|---|---|---|---|---|
| 6,198,906 | B1* | 3/2001 | Boetje et al. ...................... 705/7 |
| 6,411,992 | B1* | 6/2002 | Srinivasan et al. ............ 709/218 |
| 6,463,206 | B1* | 10/2002 | Yuen et al. ....................... 386/69 |
| 6,463,585 | B1* | 10/2002 | Hendricks et al. .............. 725/35 |
| 6,477,185 | B1* | 11/2002 | Komi et al. .................... 370/536 |
| 6,532,442 | B1* | 3/2003 | Schumacher et al. ............. 704/2 |
| 7,080,392 | B1* | 7/2006 | Geshwind ........................ 725/34 |
| 2003/0033174 | A1* | 2/2003 | Ikeda et al. ........................ 705/5 |
| 2004/0162812 | A1* | 8/2004 | Lane et al. ......................... 707/3 |
| 2006/0271523 | A1* | 11/2006 | Brookler et al. ................... 707/3 |
| 2006/0271868 | A1* | 11/2006 | Sullivan et al. ................ 715/764 |
| 2006/0271956 | A1* | 11/2006 | Endo et al. ...................... 725/45 |

OTHER PUBLICATIONS

Agnihotri, "Multimedia Summarization and Personalization of Structured Video", Feb. 2005, Doctoral Dissertation, Columbia University, p. 1-242. <Retrieved from ProQuest Dissertations Jan. 15, 2009>.*

Babaguchi et al, "Generation of Personalized Abstract of Sports Video", Aug. 2001, ICME 2001, IEEE Press, p. 800-803. <Retrieved from IEEExplore Jan. 15, 2009>.*

(Continued)

Primary Examiner — Khanh B Pham
(74) Attorney, Agent, or Firm — Buckley, Maschoff & Talwalkar LLC

(57) ABSTRACT

One or more embodiments of the invention enable a user to search for at least one value in layers of audience specific data comprising language, regional, regulatory and/or cultural specific values per layer. The word "audience" for the purposes of this specification means a group of document consumers such as people or computers that are associated with a language, country, region, regulation or culture. A search utilizing at least one embodiment of the invention occurs with respect to data that makes use of rule-based inheritance. For a three level inheritance embodiment, there are 8 permutations involving a NULL value in at least one of the layers, instead of making the user calculate the proper mask, the Current Audience Layer mask can be logical ORed with the Primary Audience Layer Mask or the Secondary Audience Layer Mask in order to create the desired search combination. In addition, predefined audience layer operators may also be used comprising "has value", "is missing value", "inherits primary", "inherits secondary", "inherits any" and "does not inherit". These predefined masks save the user from generating a bit mask for searching by hand.

21 Claims, 11 Drawing Sheets

OTHER PUBLICATIONS

Buczak et al, "Personalization: Improving Ease-of Use, Trust and Accuracy of a TV Show Recommender", May 2002, IEEE, Proceedings of TV 2002, p. 1-10. (Repaginated) <Retrieved from internet Jan. 15, 2009>.*

Brassil, "Structuring Internet Media Streams with Cueing Protocols", Aug. 2002, IEEE/ACM Transactions on Networking, p. 466-476. <Retrieved from internet Jan. 15, 2009>.*

Hjelsvold et al, "Web-based Personalization and Management of Interactive Video", May 2001, ACM WWW10, p. 129-139. <Retrieved from ACM Portal Jan. 15, 2009>.*

Yasugi et al, "Detection of Identical Events from Broadcasted Sports Video by Comparing Camera Works", Oct. 2001, ACM MIR 2001, p. 66-69. <Retrieved from internet Jan. 15, 2009>.*

Zimmerman, "TV Personalization System: Design of a TV Show Recommender Engine and Interface", Nov. 2004, p. 27-51.*

* cited by examiner

Figure 1

MAIN DATA TABLE

| PRODUCT_ID | NAME_ID | DESCRIPTION_ID | ... | ACCESSORY | WEIGHT |
|---|---|---|---|---|---|
| 220304 | 17 | 334 | ... |  | 1.2 |
| 220305 | 22 | 427 | ... | 29;47 | 0.6 |

Figure 2

DATA ATTRIBUTE TABLE

| NAME_ID | AUDIENCE_ID | NAME | ... |
|---|---|---|---|
| 17 | 0 | tennis sweater | ... |
| 17 | 1 | tennis jumper | ... |
| 22 | 0 | tennis ball | ... |
| 29 | 0 | ball bag | ... |
| 47 | 0 | ball basket | ... |

Figure 3

AUDIENCE ORDER TABLE

| audience_ID | audience_order | position | alive |
|---|---|---|---|
| 0 | 0;1;4;#;3;2 | 0 | TRUE |
| 1 | 1;0;#;4 | 1 | TRUE |
| 2 | 2 | 2 | FALSE |
| 3 | 3;0;1;2 | 3 | TRUE |
| 4 | 0;4;#;1 | 0 | TRUE |
| ... | ... | ... | |

Figure 4

AUDIENCE TABLE

| audience_ID | language | country | region | name | ... |
|---|---|---|---|---|---|
| 0 | eng | USA | whole | English US | ... |
| 1 | eng | AUS | whole | English Australia | ... |
| 2 | esp | MEX | whole | Spanish Mexico | ... |
| 3 | eng | USA | California | English Calif | ... |
| 4 | eng | CAN | whole | English CAN | |

Figure 5

Coarse grained IS NULL and IS NOT NULL Operators versus Field Type

| Operator v. Field Type | Returns TRUE based on field type | | |
|---|---|---|---|
| | Non-Lookup Field | Lookup Field | Multi-Value Lookup |
| IS NOT NULL | Returns TRUE if there is a value in any layer for this field | Returns TRUE if there is a link in any layer for this field | Returns TRUE if there is a link in any layer for this field |
| IS NULL | Returns TRUE if there are no values in any layer for this field | Returns TRUE if there are no links in any layer for this field | Returns TRUE if there are no links in any layer for this field |

Figure 6

Value or link locations with Audience Inheritance

| Case | Current Layer | Primary Inherited | Secondary Inherited |
|---|---|---|---|
| 0 | | | |
| 1 | | | • |
| 2 | | • | |
| 3 | | • | • |
| 4 | • | | |
| 5 | • | | • |
| 6 | • | • | |
| 7 | • | • | • |

A bullet (•) means there is a value in a non-lookup field, or a link in a lookup field, or a link in a multi-value lookup field in the corresponding audience layer.

Figure 7

The Fine Grained Audience Layer Operators versus the location of a value or link.

| Audience Layer Operator versus location of value or link | Location of value for Non-Lookup Field, or link for Lookup Field or link for Multi-Valued Lookup Field as per the cases detailed in Figure 2 | | | | | | | |
|---|---|---|---|---|---|---|---|---|
| | 0 | 1 | 2 | 3 | 4 | 5 | 6 | 7 |
| HAS VALUE | | | | | • | • | • | • |
| IS MISSING VALUE | • | • | • | • | | | | |
| INHERITS PRIMARY | | | • | • | | | | |
| INHERITS SECONDARY | | • | | | | | | |
| INHERITS ANY | | • | • | • | | | | |
| DOES NOT INHERIT | • | | | | • | • | • | • |

A bullet (•) means that the audience operator returns a TRUE test result.

METHOD FOR TESTING LAYERED DATA FOR THE EXISTENCE OF AT LEAST ONE VALUE

BACKGROUND OF THE INVENTION

1. Field of the Invention

Embodiments of the invention described herein pertain to the field of computer systems. More particularly, but not by way of limitation, one or more embodiments of the invention enable a user to search for at least one value in layers of audience specific data comprising language, regional, regulatory and/or cultural specific values.

2. Description of the Related Art

Current systems comprise storing data associated with multiple languages using techniques that are memory and labor intensive. These systems do not take advantage of values that are identical in each language and do not allow for inheriting values and searching values within separate localizations. Internationalization efforts to date allow for language, country and locale variations, but do not allow for further subdivisions based on regional, regulatory, cultural variations. When searching for a value using these systems, each independent data set must be searched in order to find a value existing in a particular localization.

For at least the limitations described above there is a need for a system that quickly enables a user to search for at least one value in layers of audience specific data comprising language, regional, regulatory and/or cultural specific values per layer.

SUMMARY OF THE INVENTION

One or more embodiments of the invention enable a user to search for at least one value in layers of audience specific data comprising language, regional, regulatory and/or cultural specific values. The word "audience" for the purposes of this specification means a group of document consumers such as people or computers that are associated with a language, country, region, regulation or culture. Audience specific data therefore is data targeted at a specific audience. A search utilizing at least one embodiment of the invention makes use of rule-based inheritance in finding values in layers that comprise audience specific data.

Initial creation of a multi-audience document comprises setting up an audience inheritance hierarchy and entry and edit of data for each desired audience. The audience hierarchy may be implemented as a tree or linear structure or any other structure allowing for one audience to specify another audience in which to inherit data from. For example when obtaining a data value for a particular audience, if that value does not exist for that audience then the audience hierarchy may be utilized to find the data value for an inherited audience. A data value may exist in the main data table or a data attribute table in the case of a lookup value as will be explained below. By adding regional, cultural or regulatory subdivisions within the audience hierarchy and inheriting large portions of existing audience specific data entries, a large number of audience specific documents may be generated with a minimal amount of data entry required. Use of an audience hierarchy eliminates redundant data entry, minimizes the maintenance required to support the data and allows for rapid addition of audiences to be utilized in generating a particular document. Updating information for multiple audiences occurs automatically without the need to update all entries for a given hierarchy since inherited values are automatically available to audiences in the same hierarchy. The main data table is not required to be altered when adding an audience, as an audience is defined in the audience table and lookup values may be added for an audience to the data attribute table. Audiences may be specified in a given order for traversal within the hierarchy and used in order to display data with visual characteristics to inform a user if the value for a particular piece of data is being used from the current layer or is inherited.

Data may also be imported into the system and associated with a particular layer. After importing data, the data may be searched. When importing data, the import can be directed to a particular audience layer by querying the user, or obtaining an associated audience identifier from the user or from a computer in any convenient manner. In this manner the supported audiences may be built up from external programs or data sources and independently entered into the system. Exporting data may comprise exporting a particular audience layer or exporting all audience layers. Import and export may make use of existing file formats and applications from various software manufacturers.

Searching multi-layered data occurs with respect to a current audience identifier once the audience hierarchy is set up and data has been entered or imported or otherwise exists for a plurality of audiences. The audience identifier may be entered manually or automatically from the user or computer associated with a user. The audience identifier may specify the language, or the language and country, or the language, country and region, or the language, region and culture, or the culture and regulatory area or any other combination of audience identifying values. A document targeted at a particular audience that also may inherit values from other audiences may be searched at any time after data has been entered into the system and before or after this data is edited. Specifying the current audience identifier allows for the proper hierarchy to be used in the search as per the inheritance hierarchy defined for each audience comprising data in the repository.

Initial entry of data specific to an audience may comprise adding a very small amount of data if the audience may be based extensively on another audience. For example if one region of a given country does not allow a particular picture or word to be used for a given document, then that region may be defined as a separate audience that uses all of the data of an inherited audience except for the word or picture that is not allowed. If a particular color is undesirable for display in a given culture, then that color may be altered just for that culture. The actual addition of the data specifying the audience itself comprises a small amount of data and defines the hierarchy to traverse when a data entry is not found for a particular audience. By viewing the data and the associated color or other visual representation associated with an audience, the minimal amount of data entries may be made to take advantage of other existing audience data. One embodiment of the invention utilizes three layers of inheritance called the current, primary and secondary inheritance layer levels. The visual representation may involve the color black for the current layer, green for the primary inheritance layer and red for the secondary inheritance layer. In this case, when viewing the data under a current audience setting, text that is inherited from a first inherited audience may be green, and text for an audience that uses a secondary inheritance audience may be red. Pictures that are inherited may be surrounded by a black, green or red border to depict their inheritance level for example. Any other method of visually displaying the different levels of inheritance is in keeping with the spirit of the invention such as for example showing the current audience layer in bold type, the primary inheritance audience layer in regular type and the secondary inheritance audience layer in italic.

There are at least three types of fields used with embodiments of the invention, non-lookup fields, lookup fields and multi-value lookup fields. Non-lookup fields are traditional fields that have a value in a field. Lookup fields comprise a link to another table that specifies a value in the second table. Multi-value lookup fields may comprise more than one link to another table or alternatively may comprise a link identifier to a number of fields in another table. Multi-value lookup fields that comprise more than one link per field are shown herein with semicolons separating the multiple links in a given field. One skilled in the art will readily appreciate that any method of indirectly associating multiple values with one field is in keeping with the spirit of the invention.

Values may be searched for NULL or non-NULL entries for all layers at once or on a fine grained level. When searching for NULL entries, values or links to values are tested depending on the type of the field. For fields of type non-lookup, values themselves are checked. For fields of type lookup or multi-value lookup, the links themselves are tested. To determine if a value pointed at by a link is null, the sub-table itself may be tested for NULL values that are referenced by a given link. In practice, however, with a multi-audience repository and audience inheritance, the "IS NULL" operator may not always be granular enough, since it does not distinguish between the various cases of missing data such as data missing entirely from all layers, missing from the current layer but inherited from some other layer, and so on.

To deal with these different cases of data locations with audience inheritance, the system may utilize audience layer operators that allow for searching for data or the existence of data with fine grained granularity in specified layers. For lookup fields, the audience layer operator used in a search returns true for fields that have a link to a given lookup value. For multi-value lookup fields, the audience layer operator used in a search returns true for fields that have at least one link to a given lookup value. In multi-audience data sets, searching for the existence of data using the coarse grained "IS NULL" operator returns non-lookup fields that have all associated audience inheritance levels set to NULL or lookup fields that do not link to a sub-table. The fine grained "HAS VALUE" operator checks for missing data in the current audience layer only as opposed to checking in all layers as the coarse grained "IS NULL" operator does. Other predefined audience layer operators may also be used for fine grain searching such as "HAS VALUE", "IS MISSING VALUE", "INHERITS PRIMARY", "INHERITS SECONDARY", "INHERITS ANY", "DOES NOT INHERIT". "HAS VALUE" and "IS MISSING VALUE" are complementary functions used to determine if the current audience layer comprises a value or whether the converse is true. For lookup fields these functions are used in order to check for values or missing values across the set of all links. "INHERITS PRIMARY" returns a match when the current audience layer inherits a value from either the primary or secondary audience layer and "INHERITS SECONDARY" returns a match when the current audience layer inherits from only the secondary audience layer, while "INHERITS ANY" returns a match when either of the previous two cases is true. "DOES NOT INHERIT" returns a match when there is a current audience layer value for non-lookup fields or when all layers are null.

There are at least three different types of searches that may be performed using embodiments of the invention, drill down searching, free form searching, and keyword searching. Drill down searching is a method of searching for records by selecting values for lookup fields one after another to progressively narrow the set of matching records to the desired level. Free form searching is a method of searching for records by specifying text or numbers for non-lookup fields of the target records. Free-form search uses operators such as AND, OR, NOT NULL, GREATER THAN, STARTS WITH, CONTAINS, etc. Key word searching is a special kind of free-form search. With keyword searching, each string of characters separated by a space that you type is treated as a distinct keyword. The system searches simultaneously against all of the fields that have been flagged to participate in keyword searches, rather than searching against just a single field. Keyword search matches a record if it can match all of the keywords entered for the search within any of the flagged fields of the record. The selected operator (GREATER THAN, STARTS WITH, CONTAINS, etc.) determines the kind of match required for each of the typed keywords. Keyword searching may be utilized in one or more embodiments to search only the current audience layer and the primary inherited audience layer. This allows for searching in what will be the generated document data only. Other embodiments of the invention allow for the level in which to keyword search to be set to any desired level.

BRIEF DESCRIPTION OF THE DRAWINGS

FIG. 1 illustrates a main data table used in conjunction with one or more embodiments of the invention.

FIG. 2 illustrates a data attribute table used in conjunction with one or more embodiments of the invention.

FIG. 3 illustrates an audience order table used in conjunction with one or more embodiments of the invention.

FIG. 4 illustrates an audience table used in conjunction with one or more embodiments of the invention.

FIG. 5 illustrates the coarse grained IS NULL and IS NOT NULL Operators versus Field Type.

FIG. 6 illustrates the value or link locations within the Audience Inheritance.

FIG. 7 illustrates the Fine Grained Audience Layer Operators versus the location of a value or link.

DETAILED DESCRIPTION OF THE INVENTION

Figure 8:
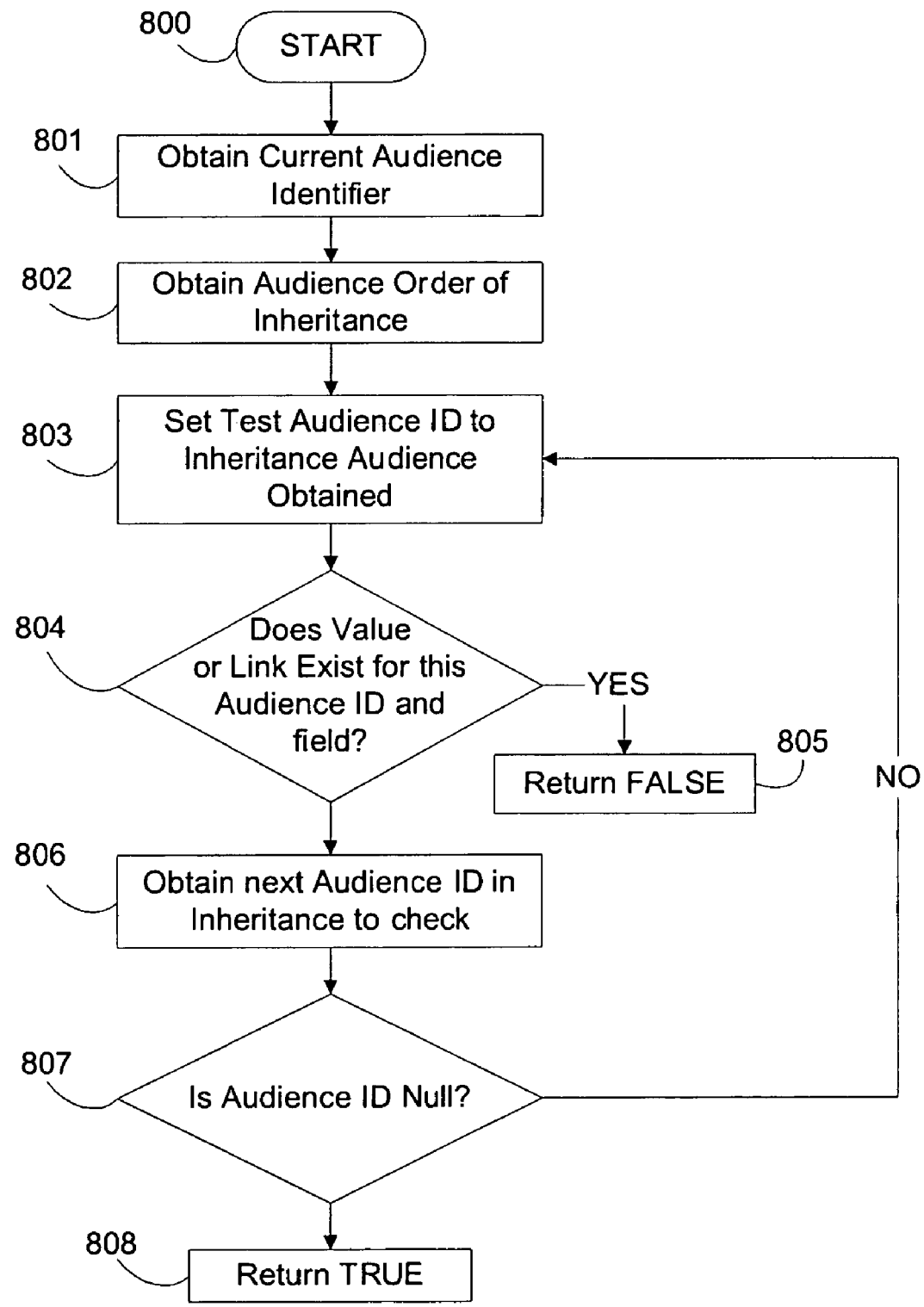
FIG. 8 illustrates an embodiment of a search method utilizing a coarse grained operator IS NULL operator on a multi-audience data set.

A method for testing layered data for the existence of at least one value will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Initial creation of a multi-audience document comprises setting up an audience inheritance hierarchy and entry and edit of data for each desired audience. The audience hierarchy may be implemented as a tree or linear structure or any other structure allowing for one audience to specify another audience in which to inherit data from. For example when obtaining a data value for a particular audience, if that value does not exist for that audience then the audience hierarchy may be utilized to find the data value for an inherited audience. A data value may exist in the main data table in the case of a non-lookup value or a data value may exist in a data attribute table in the case of a lookup value that is indirectly referenced via a link as will be explained below. FIG. 1 shows a main data table comprising products for example. The name of a product in this example is entered into another table namely the data attribute table shown in FIG. 2. For each audience that has a unique value for the given data attribute, an entry in the data attribute table may be created. For example product number 220304 shown in the main data table comprises an audience specific name that is a lookup value that is obtained from the data attribute table when generating a document. Specifically, NAME_ID 17 is obtained from the data attribute table for a desired audience identifier. In this case if the audience identifier is 0 then the name "tennis sweater" is obtained. If the audience identifier is 1 then the name "tennis jumper" is obtained. For example when obtaining a data value for a particular audience, if that value does not exist for that audience then the audience hierarchy may be utilized to find the data value for an inherited audience. In this case, if audience 1 is used in obtaining the name of product 220305, then reference name identifier 22 is used to look up the actual product name in the data attribute table. Since there is no name identifier and audience identifier combination that yields a name (no NAME_ID 17 and AUDIENCE_ID 1 entry exists in the data attribute table), then the audience order table shown in FIG. 3 is referenced in order to obtain the next audience identifier to use in finding a suitable value via inheritance. Since the next value in the audience order field for audience 1 is 0, then audience 0 is used in looking up the value next in the data attribute table. In this way, only one entry for a given data entry is required since multiple audiences can share the value. In other words, the value "tennis ball" is obtained since the NAME_ID 22 and AUDIENCE_ID 0 is used to obtain this inherited value. In FIG. 1, the ACCESSORY field shows a NULL value for PRODUCT_ID 220304 and a value of "29;47" for PRODUCT_ID 220305. The "29; 47" entry is a multi-value lookup field that specifies two links to the data attribute table. The WEIGHT column shows entries that are local to the main data table and are not obtained via lookup using the data attribute table.

By adding regional, cultural or regulatory subdivisions within the audience hierarchy and inheriting large portions of existing audience specific data entries, a large number of audience specific documents may be generated with a minimal amount of data entry required. In the example shown in FIG. 2, if there a thousand separate entries related to tennis and only a few of the items differ in name between audiences, then the second audience addition comes at very little expenditure of labor in entering the data that differs. For example, audience 1 corresponding to English Australia in the audience table shown in FIG. 4 may be added taking advantage of nearly all of the entries of the English US audience. In addition, setting up a corresponding audience order entry in the audience order table shown in FIG. 3 allows for the traversal of audiences in a hierarchical manner in order to obtain or search for values or the existence of values. For this example, audience 1 specifies that it first utilize its own audience identifier 1 in obtaining or searching for data, followed by audience identifier 0. The semicolon specifies a stop flag that denotes that any data found lower (to the right) in the hierarchy should not be published, but may be shown on the user interface to aid in the publication of a multi-audience document.

There are at least three types of fields used with embodiments of the invention, non-lookup fields, lookup fields and multi-value lookup fields. Non-lookup fields are traditional fields that have a value in a field such as the WEIGHT field shown in FIG. 1. Lookup fields comprise a link to another table that specifies a value in the second table such as the NAME_ID field shown in FIG. 1. Multi-value lookup fields may comprise more than one link to another table or alternatively may comprise a link identifier to a number of fields in another table such as the ACCESSORY field shown in FIG. 1. Although multi-value lookup fields that comprise more than one link per field are shown herein with semicolons separating the multiple links in a given field. One skilled in the art will readily appreciate that any method of indirectly associating multiple values with one field is in keeping with the spirit of the invention. Although the example tables shown comprise one level of indirection, the data attribute table may comprise a link to a lookup table for lookup values and a text or numerical entry for a non-lookup value thereby removing non-lookup values from the main data table and providing another level of indirection. Any level of indirection is in keeping with the spirit of the invention.

Use of an audience hierarchy eliminates redundant data entry, minimizes the maintenance required to support the data and allows for rapid addition of audiences to be utilized in generating a particular document. Updating information for multiple audiences occurs automatically without the need to update all entries for a given hierarchy since inherited values are automatically available to audiences in the same hierarchy. For example, updating the name of a non-lookup value, lookup value or multi-value lookup is automatically available to any audience inheriting values from a given audience. The main data table is not required to be altered when adding an audience, as an audience is defined in the audience table and lookup values may be added for an audience to the data attribute table. Audiences may be specified in a given order for traversal within the hierarchy and used in order to display data with visual characteristics to inform a user if the value for a particular piece of data is being used from the current layer or is inherited. For example as shown in FIG. 2, by adding any value such as was done for name identifier 22, that value is available to all audiences that comprise the audience 0 in their inheritance chain as shown in FIG. 3. The main data table shown in FIG. 1 is not required to be altered for all audiences, instead attributes are added or modified in the main data table or in the data attribute table shown in FIG. 2 and are automatically available to audiences that inherit these values.

Data may also be imported into the system and associated with a particular layer. After importing data, the data may be searched. When importing data, the import can be directed to a particular audience layer by querying the user, or obtaining an associated audience identifier from the user or from a computer in any convenient manner. In this manner the supported audiences may be built up from external programs or data sources and independently entered into the system. Exporting data may comprise exporting a particular audience layer or exporting all audience layers. Import and export may make use of existing file formats and applications from various software manufacturers.

Searching multi-layered data occurs with respect to a current audience identifier once the audience hierarchy is set up and data has been entered or imported or otherwise exists for a plurality of audiences as per FIGS. 1-4. The audience identifier may be entered manually or automatically from the user or computer associated with a user. The audience identifier may specify the language, or the language and country, or the language, country and region, or the language, region and culture, or the culture and regulatory area or any other combination of audience identifying values. Specifying the current audience identifier allows for the proper hierarchy to be used in the search as per the inheritance hierarchy defined for each audience as per the audience order shown in FIG. 3.

Initial entry of data specific to an audience may comprise adding a very small amount of data if the audience may be based extensively on another audience. For example if one region of a given country does not allow a particular picture or word to be used for a given document, then that region may be defined as a separate audience that uses all of the data of an inherited audience except for the word or picture that is not allowed. If a particular color is undesirable for display in a given culture, then that color may be altered just for that culture. The actual addition of the data specifying the audience itself comprises a small amount of data and defines the hierarchy to traverse when a data entry is not found for a particular audience. By viewing the data and the associated color or other visual representation associated with an audience, the minimal amount of data entries may be made to take advantage of other existing audience data. One embodiment of the invention utilizes three layers of inheritance called the current, primary and secondary inheritance layer levels. The visual representation may involve the color black for the current layer, green for the primary inheritance layer and red for the secondary inheritance layer. In this case, when viewing the data under a current audience setting, text that is inherited from a first inherited audience may be green, and text for an audience that uses a secondary inheritance audience may be red. Pictures that are inherited may be surrounded by a black, green or red border to depict their inheritance level for example. Any other method of visually displaying the different levels of inheritance is in keeping with the spirit of the invention such as for example showing the current audience layer in bold type, the primary inheritance audience layer in regular type and the secondary inheritance audience layer in italic. One or more embodiments of the invention use multiple inheritance levels separated by a stop flag shown in FIG. 3 as an asterisk separating inheritance levels that are capable of being used for publication versus inheritance levels that are only used for obtaining data for the user interface.

Values may be searched for NULL or non-NULL entries for all layers at once or on a fine grained level. When searching for NULL entries, values or links to values are tested depending on the type of the field. For fields of type non-lookup, values themselves are checked. For fields of type lookup or multi-value lookup, the links themselves are tested. To determine if a value pointed at by a link is null, the sub-table itself may be tested for NULL values that are referenced by a given link. In practice, however, with a multi-audience repository and audience inheritance, the "IS NULL" operator may not always be granular enough, since it does not distinguish between the various cases of missing data such as data missing entirely from all layers, missing from the current layer but inherited from some other layer, and so on. For example, if the current audience identifier is 1, then for a lookup or multi-value lookup field, the audiences with identifiers 1, 0 and 4 are checked as per the second row of the audience order table shown in FIG. 3 in combination with the NAME_ID for a particular name via the data attribute table. For example, if there is any value with a NAME_ID of 17 and an audience identifier of 1, 0 or 4, then a value exists and "IS NOT NULL" returns TRUE. FIG. 5 shows the possible outcomes for searching using the coarse grain operators "IS NULL" and "IS NOT NULL".

FIG. 6 shows value or link location cases for a three level inheritance embodiment. For example, if a value or link exists in a particular layer, a bullet is shown in the respective cell. Again, embodiments of the invention may utilize any level of indirection and the non-lookup values shown in the main data table of FIG. 1 versus the lookup values shown in the data attribute table of FIG. 2 are exemplary and are shown in this manner for ease of illustration. One skilled in the art will readily recognize that non-lookup values may be implemented one level of indirection lower as well as adding a second level of indirection to the lookup and multi-value lookup fields.

To deal with the different cases of data locations with audience inheritance as shown in FIG. 6, the system may utilize audience layer operators that allow for searching for data or the existence of data with fine grained granularity in specified layers at shown in FIG. 7. For non-lookup fields, the audience layer operator used in a search returns TRUE for fields that have a non-null value. For lookup fields, the audience layer operator used in a search returns TRUE for fields that have a link to a given lookup value. For multi-value lookup fields, the audience layer operator used in a search returns TRUE for fields that have at least one link to a given lookup value. In multi-audience data sets, searching for the existence of data using the coarse grained "IS NULL" operator returns non-lookup fields that have all associated audience inheritance levels set to NULL or lookup fields that do not link to a sub-table. The fine grained "HAS VALUE" operator checks for missing data in the current audience layer only as opposed to checking in all layers as the coarse grained "IS NULL" operator does. Other predefined audience layer operators may also be used for fine grain searching such as "HAS VALUE", "IS MISSING VALUE", "INHERITS PRIMARY", "INHERITS SECONDARY", "INHERITS ANY", "DOES NOT INHERIT".

The "HAS VALUE" and "IS MISSING VALUE" operators provide complementary functions used to determine if the current audience layer comprises a value or link or whether the converse is true. This corresponds to the current layer column of FIG. 6. The "INHERITS PRIMARY" operator returns TRUE when the current audience layer inherits a value or link from the primary inheritance layer but not from the secondary inheritance layer or current layer and corresponds to rows 2 and 3 of FIG. 6. The "INHERITS SECONDARY" operator returns TRUE when the current audience layer inherits a value or link from the secondary inheritance layer but not from the primary inheritance layer or current layer and corresponds to row 1 of FIG. 6. The "INHERITS ANY" operator returns TRUE when the current audience layer inherits a value or link from either the primary or secondary audience layer. The "DOES NOT INHERIT" operator returns TRUE when the current audience layer does not inherit a value or link which corresponds to finding the value or link in the current audience or not finding any value at all in which to inherit from and this corresponds to rows 0, 4, 5, 6 and 7 of FIG. 6. Other embodiments of the invention may return the actual value or link for a positive result and a null reference for a negative result.

There are at least three different types of searches that may be performed using embodiments of the invention, drill down searching, free form searching, and keyword searching. Drill down searching is a method of searching for records by selecting values for lookup fields one after another to progressively narrow the set of matching records to the desired level. Free form searching is a method of searching for records by specifying text or numbers for non-lookup fields of the target records. Free-form search uses operators such as AND, OR, NOT NULL, GREATER THAN, STARTS WITH, CONTAINS, etc. Key word searching is a special kind of free-form search. With keyword searching, each string of characters separated by a space that you type is treated as a distinct keyword. The system searches simultaneously against all of the fields that have been flagged to participate in keyword searches, rather than searching against just a single field. Keyword search matches a record if it can match all of the keywords entered for the search within any of the flagged fields of the record. The selected operator (GREATER THAN, STARTS WITH, CONTAINS, etc.) determines the kind of match required for each of the typed keywords. Keyword searching may be utilized in one or more embodiments to search only the current audience layer and the primary inherited audience layer. This allows for searching in what will be the generated document data only. Other embodiments of the invention allow for the level in which to keyword search to be set to any desired level as per FIG. 7. One or more embodiments of the invention allow for any combination of drill down searching, free form searching, and keyword searching in order to search for a value or link or existence of a value or link in any fine or coarse grained set of audience layers. The result of the combination of drill down searching, free form searching, and keyword searching may return a set of records or a boolean to indicate the existence or non-existence of a result set.

A method for coarse grain searching using an embodiment of the invention is shown in FIG. 8. The process starts at 800 and in this Figure the "IS NULL" coarse grained operator is utilized in the search. The "IS NOT NULL" operator uses an identical process but returns TRUE where this figure returns FALSE and visa versa. Searching using the "IS NULL" operator on a multi-audience data set is performed with respect to a "current audience identifier" that is obtained at 801. As previously detailed, the current audience identifier specifies the hierarchy of audiences to check for values and this hierarchy is obtained at 802 as per FIG. 3. The audience test identifier to use to test for the existence of a value is set at 803 to the first audience identifier obtained at 802. If a value or link exists for this test audience identifier and field at 804, then the "IS NULL" operator returns FALSE at 805. If there is no value or link found at 804, then the next audience identifier listed in the audience order of inheritance for this audience is obtained at 806. If the next audience identifier is null at 807 then the "IS NULL" operator returns TRUE at 808. If the next audience identifier is not null meaning that there is another audience in the hierarchy to utilize, then processing continues at 803. This process continues until a value or link is found, or the audience hierarchy is exhausted for the current audience. This testing for the existence of a value is coarse grained since there is no control over the layer in which the value or link is to be searched in.

Figure 9:
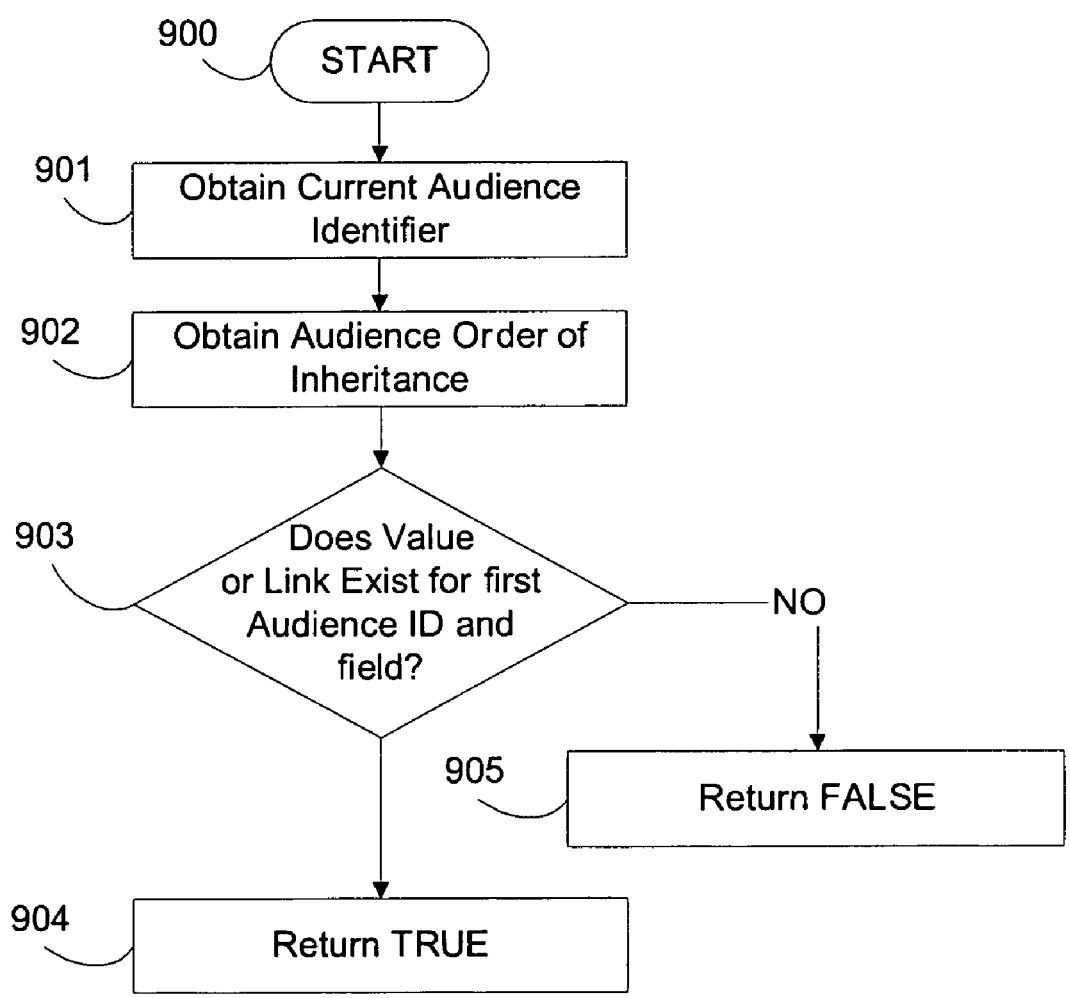
FIG. 9 illustrates an embodiment of a search method utilizing a fine grained operator "HAS VALUE" on a multi-audience data set.
Figure 10:
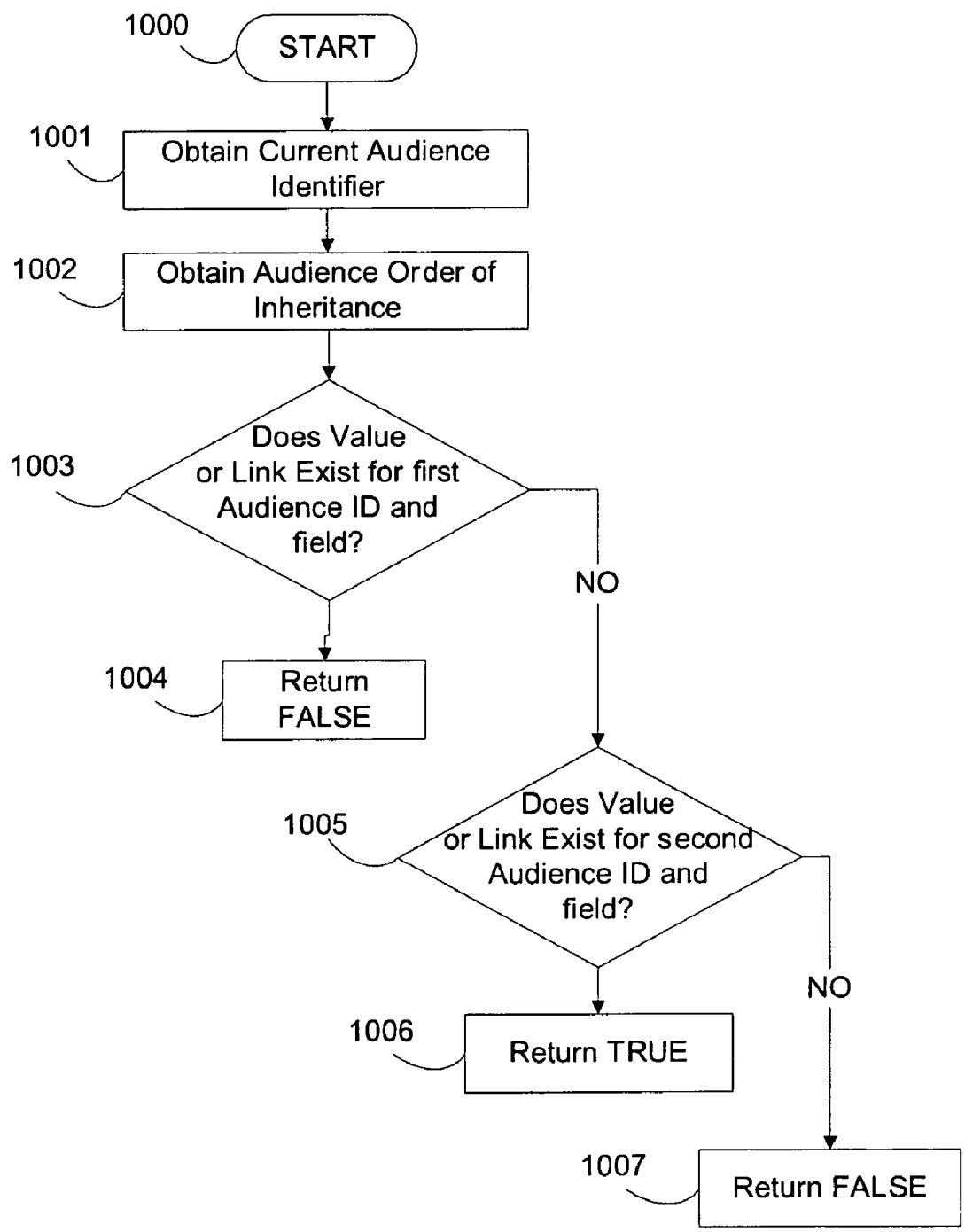
FIG. 10 illustrates an embodiment of a search method utilizing a fine grained operator "INHERITS PRIMARY" on a multi-audience data set.
Figure 11:
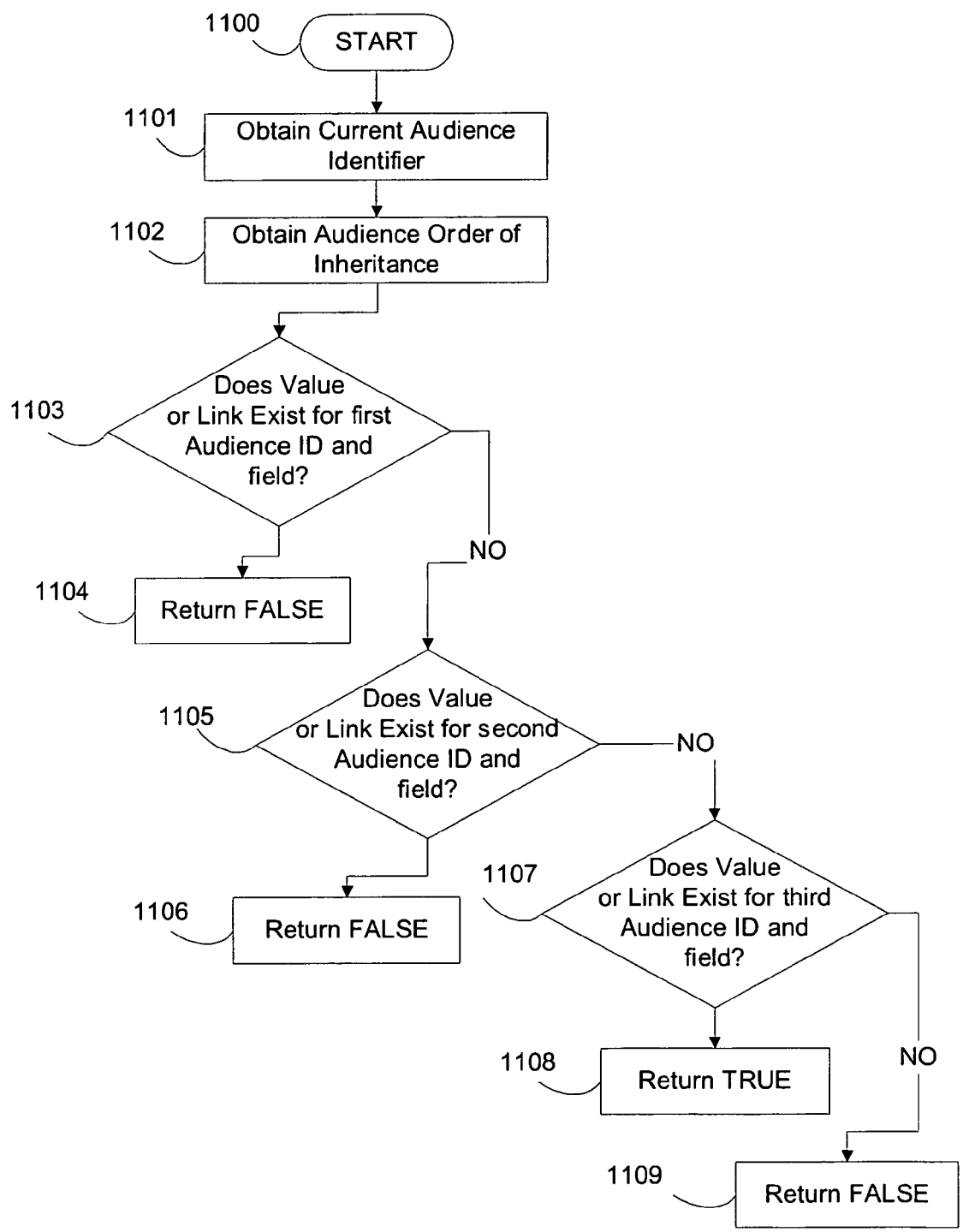
FIG. 11 illustrates an embodiment of a search method utilizing a fine grained operator "INHERITS SECONDARY" on a multi-audience data set.

A method for fine grain searching using an embodiment of the invention is shown in FIG. 9. For the fine grained operator "HAS VALUE" the process starts at 900, the current audience identifier is obtained at 901. The audience order of inheritance is obtained at 902. If the value or link exists for the first audience level of inheritance for the desired field at 903 then the operator result is TRUE at 904. Otherwise, the result returned is FALSE at 905.

For the fine grained operator "INHERITS PRIMARY", the process starts at 1000 and the current audience identifier is obtained at 1001. The audience order of inheritance is obtained at 1002. The first audience identifier in the audience order of inheritance is used with the desired field in order to check if a value of field exists for this first level of inheritance at 1003. If it does, then the operator returns FALSE at 1004, since the primary inheritance level is not used for a given field with respect to the current audience identifier. If the value or link exists for the second audience identifier obtained from the audience order of inheritance at 1005, then the operator result returned is TRUE at 1006 since the primary inheritance layer is being used for a given field with respect to the current audience identifier. If the value or link for a field does not exist for the second audience identifier then the operator result returns FALSE at 1007.

For the fine grained operator "INHERITS SECONDARY", the process starts at 1100 and the current audience identifier is obtained at 1101. The audience order of inheritance is obtained at 1102. The first audience identifier in the audience order of inheritance is used with the desired field in order to check if a value of field exists for this first level of inheritance at 1103. If it does, then the operator returns FALSE at 1104, since the primary inheritance level is not used for a given field with respect to the current audience identifier. The second audience identifier in the audience order of inheritance is used with the desired field in order to check if a value of field exists for this second level of inheritance at 1105. If it does, then the operator returns FALSE at 1106, since the secondary inheritance level is not used for a given field with respect to the current audience identifier. If the value or link exists for the third audience identifier obtained from the audience order of inheritance at 1107, then the operator result returned is TRUE at 1108 since the secondary inheritance layer (third layer) is being used for a given field with respect to the current audience identifier. If the value or link for a field does not exist for the third audience identifier then the operator result returns FALSE at 1109.

For the fine grained operator "INHERITS ANY", the processing is identical to "INHERITS SECONDARY" except that the result of the step 1105 is TRUE at 1206 if there is a value or link that exists for the second audience inheritance level or if there is a value or link that exists for the third audience inheritance level at 1108, but there is not a value or link that exists for the first audience inheritance level at 1104. This is shown in FIG. 7 as case 1, 2 and 3 in the "INHERITS ANY" row.

Figure 12:
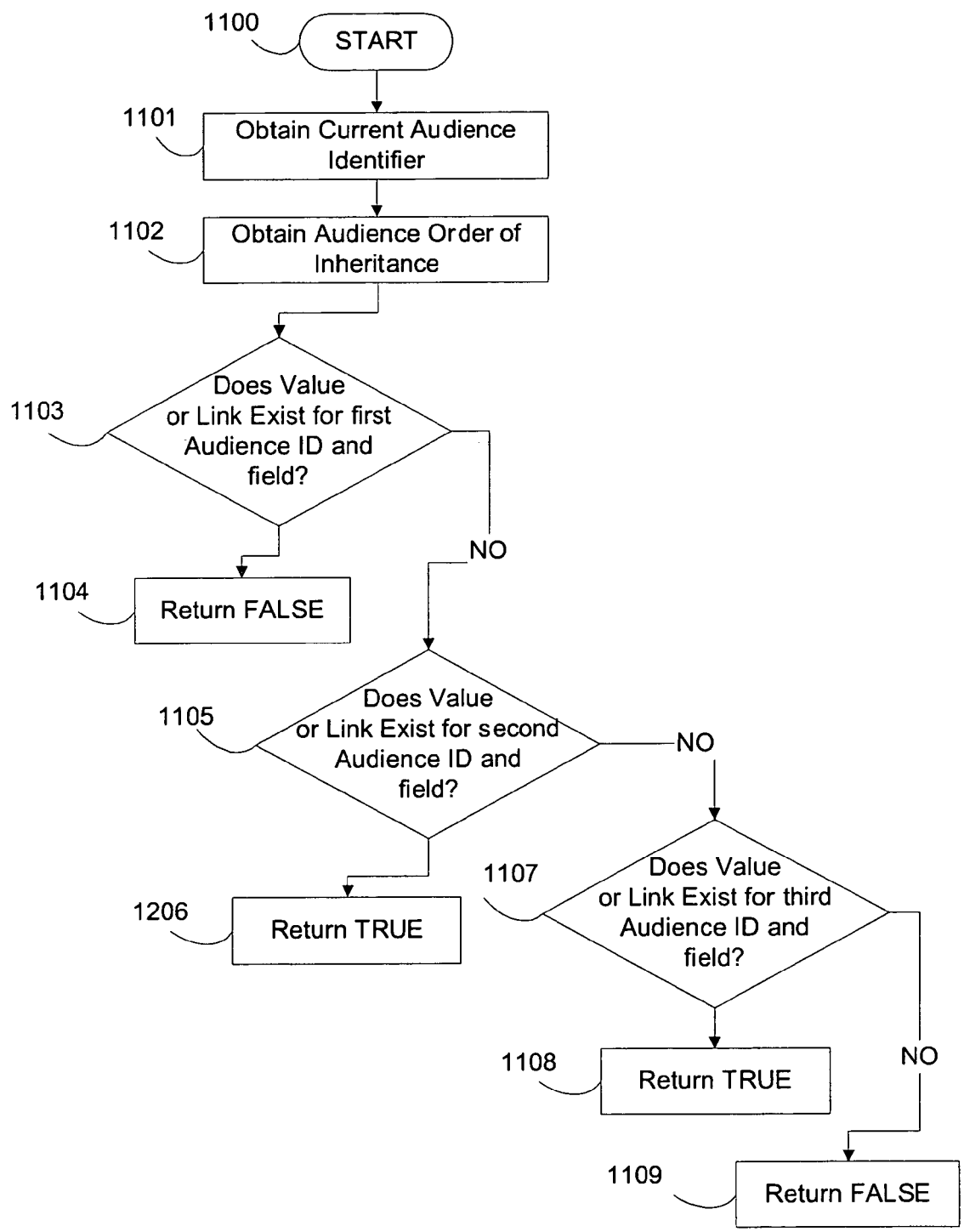
FIG. 12 illustrates an embodiment of a search method utilizing a fine grained operator "INHERITS ANY" on a multi-audience data set.

The "DOES NOT INHERIT" fine grained operator comprises compliment return results compared to FIG. 12 since it returns the complimentary result compared to "INHERITS ANY". Therefore the resulting Return blocks of FIG. 12 are simply inverted from TRUE to FALSE and visa versa in order to implement this operator.

The result set returned from a coarse grained and/or fine grained operator may be further reduced by a non-lookup value search using a free form or keyword search. Regardless of the field type, all searches using one or more embodiments of the invention may utilize the audience inheritance to limit the searches to the desired audience layers. Any method of obtaining coarse or fine grained operators, free form entries and operators and keyword entries and operators including but not limited to a graphical user interface is in keeping with the spirit of the invention.

U.S. patent application Ser. No. 09/577,268 entitled "Timeshared Electronic Catalog System And Method" filed May 23, 2000, U.S. Pat. No. 6,754,666 entitled "Efficient Storage And Access In A Database Management System" filed Aug. 21, 2000, U.S. patent application Ser. No. 09/643,316 entitled "Data Indexing Using Bit Vectors" filed Aug. 21, 2000, U.S. patent application Ser. No. 09/643,207 entitled "Data Editing And Verification User Interface" filed Aug. 21, 2000, U.S. patent application Ser. No. 09/960,902 entitled "Method And Apparatus For Structuring, Maintaining, And Using Families Of Data" filed Sep. 20, 2001, U.S. patent application Ser. No. 10/022,056 entitled "Method And Apparatus For Transforming Data" filed Dec. 12, 2001, U.S. patent application Ser. No. 09/960,541 entitled "Method And Apparatus For Dynamically Formatting And Displaying Tabular Data In Real Time" filed Sep. 20, 2001, U.S. patent application Ser. No. 10/172,572 entitled "Method And Apparatus For Generating And Utilizing Qualifiers And Qualified Taxonomy Tables" filed Jun. 13, 2002, U.S. patent application Ser. No. 10/990,293, entitled "Accelerated System And Methods For Synchronizing, Managing, And Publishing Business Information" filed Nov. 15, 2004, U.S. patent application Ser. No. 10/990,292 entitled "System And Method For Dynamically Constructing Synchronized Business Information User Interfaces" filed Nov. 15, 2004, U.S. patent application Ser. No. 10/990,294 entitled "System And Method For Dynamically Modifying Synchronized Business Information Server Interfaces" filed Nov. 15, 2004, are all hereby incorporated herein by reference. PLUS THE LATEST ONES While the invention herein disclosed has been described by means of specific embodiments and applications thereof, numerous modifications and variations could be made thereto by those skilled in the art without departing from the scope of the invention set forth in the claims.

What is claimed is:

1. A computer-implemented method for testing layered data for the existence of at least one value comprising:
   accepting on a computer a subset of data for an audience with respect to another audience into a data attribute table of said computer wherein said subset of data is unique with respect to said another audience, wherein audience data for said audience not contained in said subset of data is inherited from at least one other audience including said another audience, wherein said audience and said another audience differ in one or more of language, country, region, regulatory, or cultural designations;
   obtaining on said computer a current audience identifier wherein said current audience identifier is associated with a current layer of data corresponding to a current audience;
   obtaining on said computer an audience order of inheritance defined for said current audience identifier, wherein said audience order of inheritance is implemented as a linear structure specifying two or more audience identifiers comprising a first audience identifier associated with a first layer of data for a first audience and a second audience identifier associated with a second layer of data for a second audience, wherein said second audience identifier is independently specified in said linear structure with respect to said first audience identifier;
   checking in said data attribute table for a value or link in a field in a plurality of layers of data associated with said two or more audience identifiers of said linear structure, wherein said first layer of data is checked before said second layer of data; and,
   returning a result for a search based on said checking, wherein said result indicates the existence of said value or link.

2. The computer-implemented method of claim 1 further comprising:
   accepting a coarse grained operator to determine if said value or link exists in said current layer of data or any layer of data associated with said two or more audience identifiers; and,
   applying said coarse grained operator in said search, wherein said result indicates the existence of said value or link in said current layer of data or any layer of data associated with said two or more audience identifiers.

3. The computer-implemented method of claim 1 further comprising:
   accepting a fine grained operator to determine if said value or link exists in said first layer of data associated with said first audience identifier of said linear structure; and,
   applying said fine grained operator in said search, wherein said result indicates the existence of said value or link in said first layer of data.

4. The computer-implemented method of claim 1 further comprising:
   accepting a free form search operator; and,
   applying said free form search operator to limit said result.

5. The computer-implemented method of claim 1 further comprising:
   accepting at least one key word; and,
   applying said at least one key word to limit said result.

6. The computer-implemented method of claim 1, wherein said linear structure further comprises a stop flag, wherein one or more audience inheritance levels of said linear structure before said stop flag are used for publication and any audience inheritance levels of said linear structure after said stop flag are used for displaying search data in a user interface for testing layered data.

7. The computer-implemented method of claim 1 further comprising:
   accepting a fine grained operator to determine if said value or link exists in said second layer of data associated with said second audience identifier of said linear structure; and,
   applying said fine grained operator in said search, wherein said result indicates the existence of said value or link in said second layer of data.

8. The computer-implemented method of claim 7 further comprising:
   accepting a free form search operator;
   applying said fine grained operator and said free form search operator, wherein said result is limited by said free form search operator.

9. The computer-implemented method of claim 1 further comprising:
   accepting a fine grained operator to determine if said value or link exists in any layer of data associated with said two or more audience identifiers of said linear structure; and,
   applying said fine grained operator in said search, wherein said result indicates the existence of said value or link in said any layer of data.

10. The computer-implemented method of claim 9 further comprising:
    accepting a free form search operator;
    applying said fine grained operator and free form search operator, wherein said result is limited by said free form search operator.

11. The computer-implemented method of claim 1 further comprising:

accepting a fine grained operator to determine if said value or link exists in said current layer of data associated with said current audience identifier; and, applying said fine grained operator in said search, wherein said result indicates the existence of said value or link in said current layer of data.

12. The computer-implemented method of claim 11 further comprising:

accepting a free form search operator;

applying said fine grained operator and said free form search operator, wherein said result is limited by said free form search operator.

13. The computer-implemented method of claim 1 further comprising:

exporting said current layer of data associated with said current audience identifier, including all existing values.

14. The computer-implemented method of claim 13 further comprising:

accepting a free form search operator;

applying said fine grained operator and said free form search operator, wherein said result is limited by said free form search operator.

15. A non-transitory computer-readable medium comprising computer-executable instructions for testing layered data for the existence of at least one value, wherein execution of said computer-executable instructions by one or more processors causes said one or more processors to:

accept a subset of data for an audience with respect to another audience into a data attribute table of said database wherein said subset of data is unique with respect to said another audience, wherein audience data for said audience not contained in said subset of data is inherited from at least one other audience including said another audience, wherein said audience and said another audience differ in one or more of language, country, region, regulatory, or cultural designations;

obtain on said computer a current audience identifier wherein said current audience identifier is associated with a current layer of data corresponding to a current audience;

obtain on said computer an audience order of inheritance for said current audience identifier, wherein said audience order of inheritance is implemented as a linear structure specifying two or more audience identifiers comprising a first audience identifier associated with a first layer of data for a first audience and a second audience identifier associated with a second layer of data for a second audience, wherein said second audience identifier is independently specified in said linear structure with respect to said first audience identifier;

check said database for a value or link in a field in a plurality of layers of data associated with said two or more audience identifiers of said linear structure, wherein said first audience layer is checked before said second audience layer;

accept on said computer an operator to determine if said value or link exists in one or more layers of data;

apply said operator in relation to said checking; and, return a result set for a search based on said checking wherein said result indicates the existence of said value or link.

16. The non-transitory computer-readable medium of claim 15 wherein said operator is a coarse grained operator configured to determine if said value or link exists in said current layer of data or any layer of data associated with said two or more audience identifiers.

17. The non-transitory computer readable medium of claim 15 wherein said operator is a fine grained operator configured to determine if said value or link exists in one or more select layers of data associated with one or more select audience identifiers selected from said current audience identifier and said two or more audience identifiers of said linear structure.

18. The non-transitory computer readable medium of claim 15 wherein execution of said computer-executable instructions further causes said one or more processors to:

accept a free form search operator; and, apply said free form search operator, wherein said result is limited by said free form search operator.

19. The non-transitory computer readable medium of claim 15 wherein execution of said computer-executable instructions further causes said one or more processors to:

accept at least one key word and an associated free form search operator; and, apply said associated free form search operator and said at least one key word, wherein said result is limited by said free form search operator.

20. The non-transitory computer readable medium of claim 15 wherein execution of said computer-executable instructions further causes said one or more processors to:

accept a free form search operator;

accept at least one key word; and, apply said free form search operator and said at least one key word, wherein said result is limited by said free form search operator.

21. A non-transitory computer-readable medium comprising computer-executable instructions for testing layered data for the existence of at least one value, wherein execution of said computer-executable instructions by one or more processors causes said one or more processors to:

accept a subset of data for an audience with respect to another audience into a data attribute table of said database wherein said subset of data is unique with respect to said another audience, wherein audience data for said audience not contained in said subset of data is inherited from at least one other audience including said another audience, wherein said audience and said another audience differ in one or more of language, country, region, regulatory, or cultural designations;

obtain on said computer a current audience identifier wherein said current audience identifier is associated with a current layer of data corresponding to a current audience;

obtain on said computer an audience order of inheritance for said current audience identifier, wherein said audience order of inheritance is implemented as a linear structure specifying two or more audience identifiers comprising a first audience identifier associated with a first layer of data for a first audience and a second audience identifier associated with a second layer of data for a second audience, wherein said second audience identifier is independently specified in said linear structure with respect to said first audience identifier;

check said database for a value or link in a field in a plurality of layers of data associated with said two or more audience identifiers of said linear structure, wherein said first layer of data is checked before said second layer of data;

accept on said computer a fine grained operator configured to determine if a value or link exists in one or more select layers of data associated with one or more select audience identifiers selected from said current audience identifier and said two or more audience identifiers of said linear structure;

accept a free form search operator;

apply said fine grained operator in relation to said checking;

apply said free form search operator in relation to said checking; and, return a result set for a search based on said checking wherein said result indicates the existence of said value or link, and wherein said result is limited by said free form search operator.

\* \* \* \* \*